Walter L. Henry
Oberlin J. Ham, Jr.
INVENTORS

BY
Bertram H Mann
ATTORNEY

June 7, 1966 W. L. HENRY ETAL 3,254,497
PREVENTION OF SOLID HYDRATES IN THE LIQUEFACTION
OF NATURAL GASES
Filed Aug. 24, 1962 2 Sheets-Sheet 2
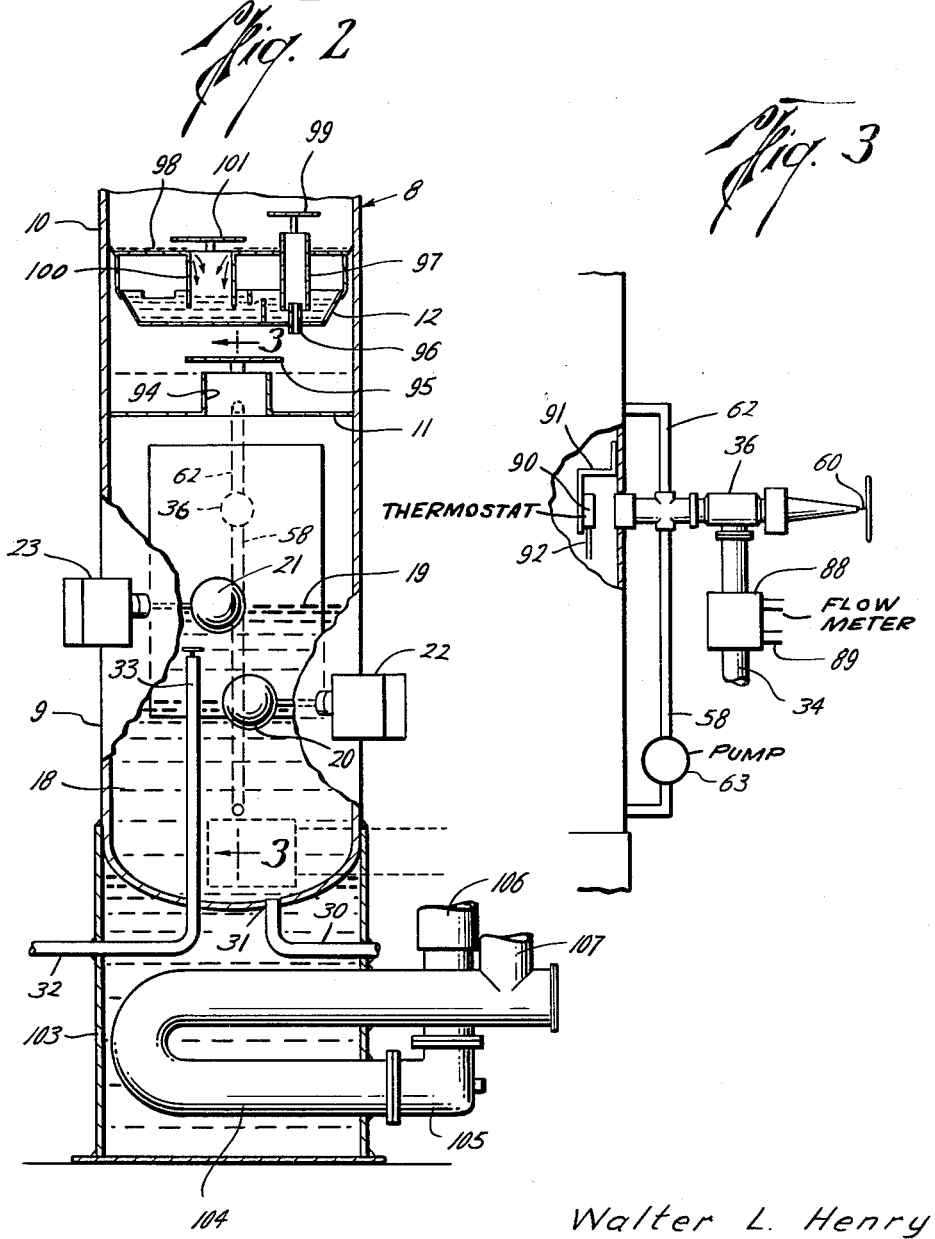
Walter L. Henry
Oberlin J. Ham, Jr.
INVENTORS
BY
Bertram N. Mann
ATTORNEY

United States Patent Office 3,254,497
Patented June 7, 1966

3,254,497
PREVENTION OF SOLID HYDRATES IN THE LIQUEFACTION OF NATURAL GASES
Walter L. Henry, Houston, and Oberlin J. Ham, Jr., Bellaire, Tex., assignors, by mesne assignments, to Reed Roller Bit Company, Houston, Tex., a corporation of Texas
Filed Aug. 24, 1962, Ser. No. 219,306
11 Claims. (Cl. 62—18)

This invention relates to liquid and gas separators particularly for natural gas streams delivered from a well and consists more particularly in novel apparatus and method for increasing the efficiency of such separators.

Present types of gas drying apparatus which utilize a drop in the pressure and temperature of the gas stream for separating out liquids, both water and hydrocarbons, have the disadvantage that if the gas stream is dropped below predetermined temperatures, on the order of 67° F. and 1200 p.s.i.g. solid hydrocarbon hydrates are formed which tend to clog the passages and, ultimately, to cut off the flow of gas. Thus, the efficiency of such separators is limited due to the fact that gas temperatures must be maintained above the temperature where such solid hydrates form or, in the alternative, the vessel must be heated to melt hydrates, or cleaned or replaced from time to time.

An example of an otherwise very efficient liquid and gas separating apparatus is shown in Daugherty Patent No. 2,916,103. In this patent, gases rise through a vertical series of reflux trays and thence through a bed of water soluble dehydrating material, such as calcium chloride. The water solution from the bed drops serially upon the reflux trays and the ring gases bubble through the solute on the trays for initial dehydration thereof. Thus, if the gas upon initially entering the vessel is first exposed to the most dilute brine on the bottom tray and is successively exposed to more concentrated solutes on successively higher trays and, finally, to the solid deliquescent chemical at the top of the vessel. While it is known that certain substances may be added to the gas stream in order to inhibit the formation of solid hydrates as the gas temperature is lowered, it has not been suggested or practical to utilize for this purpose the brine which collects in the scrubber or liquid section of a separating vessel utilizing deliquescent drying material for this purpose.

Consequently, it is an object of the present invention to provide novel means for improving the efficiency of a liquid and gas separator of the above type by permitting substantially greater temperature and pressure drops in the gas stream, with resultant improved separation of liquids therefrom while preventing the formation of solid hydrocarbon hydrates.

Another object is to provide a liquid and gas separator of the above type utilizing a deliquescent dehydrating material and also utilizing the brine formed by the dehydrating action as an inhibitor or "antifreeze" substance for preventing the formation of solid hydrates.

Another object of the invention is to provide means for insuring the presence in the liquid section of the dehydrating vessel of brine of sufficient concentration to serve as a solid hydrate inhibitor when mixed with the inflowing gas stream.

Another object is to provide a more economical operation of a liquid and gas separating apparatus of the above type by eliminating the heating instrumentality heretofore resorted to inhibit the formation of solid hydrates.

Another object is to eliminate the fire hazard incident to the provision of a burner as heretofore necessary to maintain the liquid section of the separator at a high enough temperature to prevent the formation of hydrates.

Another object is to provide a liquid and gas separator of the above type which will continue to function effectively as a dehydrating means, even after the well delivery pressure has dropped so far that low pressure separation can no longer be effectively accomplished.

The above objects and others hereafter appearing are attained in the novel apparatus herein described which consists in general of a liquid separator for gas streams utilizing a lower scrubber or liquid section, vertically succeeding reflux trays through which the gas is caused to bubble, and an upper dehydrating section containing a mass of granular deliquescent material such as calcium chloride or the like. The brine formed in the dehydrating process drops successively onto the reflux trays and, after therein absorbing some of the moisture from the rising gas stream, collects in the bottom liquid section of the vessel. A portion of this collected brine is caused to recirculate with the gas stream and, therefore, serves to inhibit the formation of solid hydrate, even though the pressure drop which occurs as the gas passes through a choke into the vessel would be sufficient under ordinary conditions, to cause the formation of solid hydrates. The recirculation of brine preferably is induced by piezometer action, that is, suction due to reduced static pressure created by the rapidly flowing gas stream as it enters the separator vessel. Means are also provided to supplement the circulation of moisture through the solid dehydrating material, either from the collected brine or from a separate source, to insure the presence in the liquid section of the vessel of brine of adequate concentration to serve the inhibiting function. In the accompanying specification and claims, the term "freeze" refers to the low temperature solidification of hydrates as well as the formation of ice. The term "antifreeze" refers to substances which inhibit such solidification.

In the accompanying drawings which illustrate the invention,

FIG. 2 is an enlarged vertical transverse section through the lower portion of the vessel.

FIG. 3 is a side view and section showing a portion of the structure in FIG. 2 taken at 90° thereto.

Figure 1:
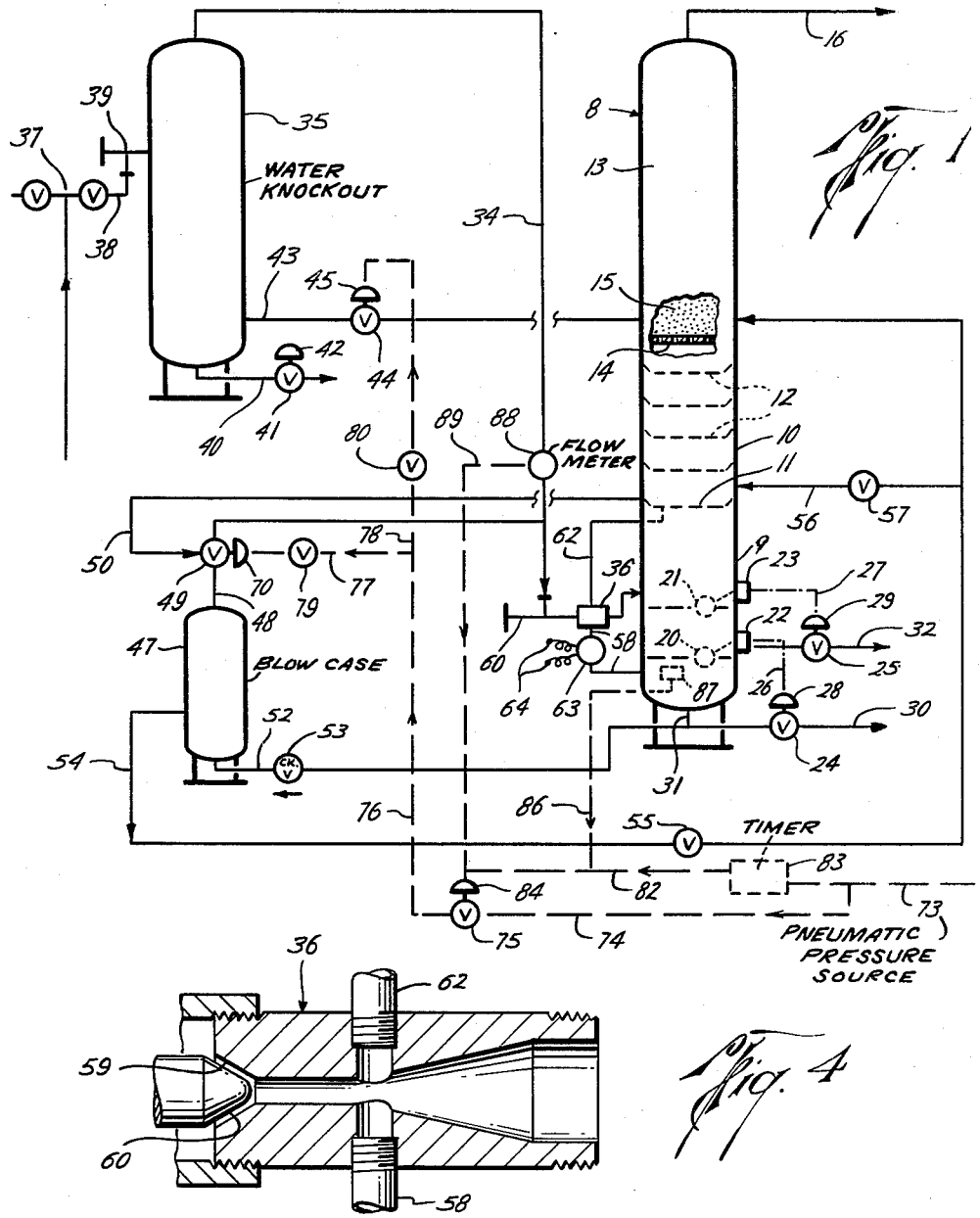
FIG. 1 is a diagrammatic view showing an exemplary form of the apparatus, several optional and alternate features being included.

FIG. 1 shows at 8 an elongated cylindrical separator vessel having a lower liquid or scrubber section 9, an intermediate section 10 containing vertically spaced trays 11 and 12, and an upper section 13 having a perforated tray 14 upon which is piled a quantity of granulated deliquescent material 15. While calcium chloride is the most convenient material for this purpose, sodium chloride, lithium chloride, sodium hydroxide, potassium hydroxide and, possibly, other deliquescent materials will serve the purpose. Such materials have a strong affinity for water and tend to form a brine when exposed thereto. A dry gas discharge line 16 leads from the top of vessel 8.

As better illustrated in FIG. 2, the liquid which accumulates in the bottom section 9 tends to stratify into a lower brine portion 18 and a superposed quantity 19 of condensed hydrocarbon. These respective quantities of brine and hydrocarbon are maintained substantially uniform by means of floats 20 and 21 acting through control devices 22 and 23 to actuate discharge valves 24 and 25 (FIG. 1) for carrying the liquids away from the vessel when excessive quantities thereof accumulate. It is contemplated that suitable actuating means, either pneumatic or electric or a combination thereof, will be provided, and control lines therefor are represented schematically by dotted lines 26 and 27 in FIG. 1 leading to valve actuators 28 and 29. The discharge line 30 (FIG. 2) for brine leads from the bottom of the vessel, as at 31, while the discharge line 32 for the liquid hydrocarbon extends upwardly by means of a stand pipe 33 above the separation surface between the brine and liquid hydrocarbon.

The main line 34 (FIG. 1) leads from the top of a water knock-out device 35 and thence through a choke generally designated 36 into the liquid section above the level of condensate 19. Gas from the wellhead 37 passes through pipe 38 and a choke 39 into vessel 35. A water drainage line is shown at 40 having a control valve 41 with an actuator 42. A second water outlet line 43 from knock-out vessel 35 passes through a control valve 44 with an actuator 45 to upper section 13 of vessel 8, above tray 14.

A blow case vessel 47 has a pipe connection 48 at its top end leading through a three-way valve 49 selectively from a pipe 50 from lowermost tray 11 and a pipe 51 which connects with main gas line 34. A pipe 52 connects the bottom of blow case vessel 47, through a check valve 53, which opens in the direction of the arrow, and pipe 31 connected to the bottom of liquid section 9 of the main separator vessel. Another pipe 54 leads from vessel 47, near the bottom thereof, through a valve 55 to solid dehydrator section 13 of vessel 8, above tray 14. A branch recirculation passage 56 leads from pipe 54 through a control valve 57 to the tray section of vessel 8 just above bottom tray 11.

Figure 4:
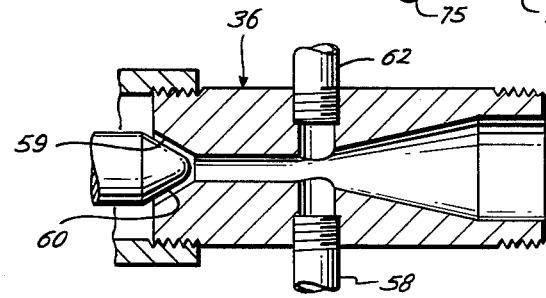
FIG. 4 is an enlarged sectional representation of the novel brine pumping choke.
Figure 5:
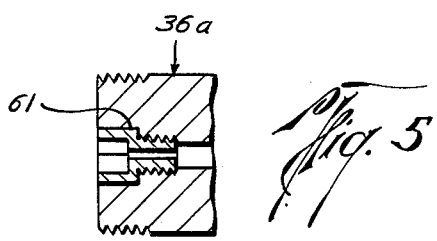
FIG. 5 shows a modification of the structure in FIG. 4.

A brine tube 58 (FIGS. 2 and 3) connects the liquid section 9 of vessel 8 with choke 36. According to FIG. 4, better showing this choke, pipe 58 connects with choke 36 at a point downstream from restriction orifice 59 which may be varied by a needle valve 60. FIG. 5 shows an alternative choke arrangement in which body 36a is provided with a replaceable metering orifice or bean 61 instead of the needle valve. Also connected to choke 36 is a pipe 62 leading from bottom tray 11. A pump 63 is included in liquid brine line 58 and provided with suitable powering means represented by electrical wires 64 (FIG. 1).

A fluid pressure source for the various controls is shown at 73. A branch pressure line 74 leads through a valve 75 and a line 76 to branch lines 77 and 78 leading respectively through valves 79 and 80, conveniently manual, to valve actuators 70 and 45, respectively, for valves 49 and 44. Another fluid pressure supply line 82 leads through a timing device 83 to control 84 for valve 75. Timing device 83 optionally may be provided for actuating valve 75 and thence either valve 49 or 44, depending on which of the valves 79 or 80 is opened, conveniently manually, to provide for the supply of make-up liquid to the top of tray 14, as will be explained. As previously pointed out, brine and hydrocarbon discharge valves 24 and 25, respectively, are actuated by floats 20 and 21 through controls 22 and 23 and power transmitting lines 26 and 27 leading to valve controls 28 and 29.

An additional control for pressure fluid line control valve 75 is provided by means of a line 86 which leads from a density measuring device (hydrometer) 87 near the bottom of liquid section 9 to pressure line 82 and valve actuator 84.

A further alternative method of controlling the supply of supplemental make-up liquid is represented by the flow meter 88 in main gas flow line 34 which is connected by a signal transmitting line 89 to valve actuator 84. Meter 88 is of the type which signals the passage of predetermined quantities of gas and utilizes such signals through line 89 to periodically open valve 75, as will be explained. Still another way of controlling the make-up liquid includes the thermostat 90 (FIG. 3) mounted on a bracket 91 in the path of the inflowing expanded gas from choke 36. A control line 92 leads to valve actuator 84 for delivering a pressure impulse to line 76 when the gas temperature in vessel 8 drops below a predetermined value.

FIG. 2 better illustrates the construction of the trays. Bottom tray 11 serves as a brine reservoir and has a single central duct 94 for accommodating upflowing gas. a baffle 95 causes the upflowing gases to change direction with consequent dropping out of entrained liquid. Each intermediate tray 12 is provided with a gas nozzle 96 which opens into a larger tube 97 wherein the rising gas is brought into intimate contact with the body of brine on the tray. After such contact with the brine, the gas continues to rise, striking a baffle 99 for further dropping out of entrained liquids. A downcomer duct 100 also extends through transverse partition 98 and is shielded by a baffle 101.

In case the apparatus is to be exposed to water freezing temperatures, a warming device may be added at the lower end, including a casing extension 103 for containing a suitable heat exchange fluid. A heating loop 104 extends through heater extension 103 from a burner device 105, with a flue 106, to a discharge flue 107.

The apparatus operates as follows: The upper part 13 of separator vessel 8 first is charged with suitable granular deliquescent material, conveniently calcium chloride. Gaseous fluid is delivered from the wellhead 37 preferably at a pressure in excess of 1800 pounds per square inch and the wellhead pressure, if necessary, is reduced by means of choke 39 to a value on the order of 1500 pounds per square inch in entering water knock-out vessel 35. The resultant gaseous fluid is then led through piping 34 to the choke unit 36 where it is expanded upon entering the liquid section of vessel 8. This expansion reduces the pressure of the gaseous fluid to a value on the order of 1000 to 1200 pounds per square inch and correspondingly reduces the temperature of the fluid to 20°–40° F. The result is a substantial condensation of hydrocarbon liquids and water which drop into the bottom 9 of vessel 8 and are there stratified, as indicated in FIG. 2. The gas then rises serially through trays 11, 12 and 14. In passing through trays 12, the gas is brought into intimate contact with brine collected on these trays and thereby progressively relieved of moisture. Ultimately, the gas passes through the perforations in tray 14 and the last traces of moisture therein are extracted by the solid chemical in upper section 13 so that substantially dry gas is discharged through duct 16 to the storage or consuming point. The brine formed by contact of moisture with the deliquescent dehydrating material 15 drops through the perforations in tray 14 onto the next lower tray 12, thence successively overflows to the trays therebeneath. This brine being also hygroscopic, has an affinity for moisture in the upflowing gases so that the quantity and concentration of brine on each tray is determined both by the amount of brine which drops through the perforations in tray 14 and also the addition thereto resulting from moisture extracted from the upflowing gases. Thus, the most concentrated brine accumulates on uppermost tray 12 while the most dilute brine is collected by the liquid or scrubber section 9 at the bottom of the vessel.

Since the contemplated drop in temperature of the gas downstream of choke 36 is sufficient, under normal conditions, to cause the formation of solid hydrocarbon hydrates, which in time would block the apparatus, it is desirable to inhibit the formation of such hydrates. This is achieved by recirculation with the gas of portions of the brine accumulated in the bottom of the separator vessel. Such brine is drawn through pipes 58 and 62 into choke 36 by venturi, piezometer or injector action caused both by the rapidly flowing gas stream in the choke and the expansion which occurs just downstream thereof. These quantities of recirculated brine under many conditions are adequate to prevent the formation of solid hydrocarbon hydrates. However, the quantity of brine furnished to the choke may be supplemented, if desirable, by the pump 63 inserted in line 58.

In some cases the concentration of brine in the liquid section due to the normal dehydrating action may be insufficient to perform the hydrate inhibiting function. Several preferably alternate means for increasing the brine concentration are illustrated. One such means includes the hydrometer control 87 in the bottom of the liquid section which responds to reduction in the density of the brine below a predetermined value to send a signal through line 86 to actuator 84 for opening pneumatic pressure control valve 75. This admits control pressure either to control 70 for blow case valve 49 or to actuator 45 for knock-out water discharge valve 44, depending upon which of the valves 79 or 80 is opened. These two valves may be selectively controlled manually. However, it is contemplated that either the knock-out 35 or the blow case 47 may be entirely omitted from the system.

Three-way valve 49, normally, will be in position to equalize pressure through piping 50 into blow case vessel 47 so that brine will accumulate in vessel 47 through line 52 with check valve 53 leading from the bottom of liquid section 9. Actuation of valve 49 by control 70 will shift this valve to apply gas pressure through line 48 to the top of blow case vessel 47, forcing the make-up liquid in vessel 47 through line 54 to salt supporting tray 14, valve 55, of course, being open. Check valve 53 prevents return of brine from case 47 to liquid section 9. Provision may be made for cutting off gas from the top of vessel 47 either manually or responsive to a drop in the liquid level in the chamber. The liquid forced through piping 54 contacts the solid chemical on tray 14 forming a brine which then drops successively through trays 12 and ultimately into the liquid section 9 where it boosts the brine concentration therein. As previously explained, the level of brine in liquid section 9 is maintained by float 20, control 22, and valve 24.

As a second alternate, make-up liquid may be supplied from water knockout vessel 35 by opening of valve 80 and closing of valve 79. A pressure impulse through valve 75, initiated, for instance, by hydrometer 87, will cause opening of valve 44 which will permit water to flow by pressure through pipe 43 to tray 14.

A third alternate for increasing the brine concentration in the liquid section 9 utilizes the timer device 83 which periodically, say every 24 hours, will pass a pressure impulse to control 84 for opening valve 75 and thereby opening either blow case gas valve 49 or water knockout valve 44, as previously. A fourth alternative liquid make-up utilizes the gas flow meter 88 in main gas line 34. This meter is designed to measure the quantity of gas flowing therethrough and, upon the passage of a predetermined quantity of gas, to transmit a signal through line 89 to control 84 for opening pressure impulse valve 75, as before.

Also, it would be possible and sometimes advantageous to energize pump 63, for instance, responsive to a hydrometer control such as 87, for increasing the percentage of brine which is carried into vessel 8 with the inflowing gas. Finally, either pump 63 or valve control 84 may be actuated by thermostat device 85 at 90 which is positioned to register the temperature of gas entering the separator vessel. This thermostat device would be designed to transmit a signal through line 92, when the temperature of the gas drops below a predetermined value, to actuate valve control 84.

One advantage of the present apparatus is that the liquid and gas separation is rendered substantially more efficient than has been possible heretofore, without the addition of heat or of antifreeze substances from an extraneous source, because of the possibility of utilizing whatever reduced pressure and temperature may be necessary to effect the desired separation. Of course, such increased efficiency encompasses the recovery of increased amounts of liquid hydrocarbons and the resultant supply of dryer gas than heretofore customary. Since no heating or extraneous antifreeze means need be provided, the cost of operation is correspondingly reduced. Moreover, the improved efficiency due to the use of lower temperatures in the separator vessel results in the consumption of less deliquescent chemicals. Finally, even though the wellhead pressure should be reduced to the point where low temperature separation of liquids is no longer feasible, the apparatus will continue to function as a dehydrator, utilizing contact of the gases with the brine on the trays and the solid chemical at the top of the vessel for extracting moisture.

As previously indicated, it is contemplated that any suitable powering and control means may be provided for the various system valves and the dotted lines in FIG. 1 merely schematically represent the necessary control connections to the valve actuators without purporting to show the complete control systems. Also it is contemplated that the details of the separator device may be modified while retaining the low temperature separation feature.

The invention may be modified in various respects as will occur to those skilled in the art and the exclusive use of all modifications as come within the scope of the appended claims is contemplated.

We claim:

1. The method of inhibiting the formation of solids during low temperature separation of liquids from a hydrocarbon gas stream initially containing gas and moisture components which comprises:

supplying a gas stream under pressure to a water knock-out vessel, separating moisture from the gas stream and collecting the separated moisture as water, passing the gas stream under pressure to a second separating vessel through a restricted connection for causing expansion of the gas stream upon entering the vessel with resultant reduced temperature and pressure, passing the expanded gas stream upwardly through a body of deliquescent dehydrating material capable of absorbing moisture from the stream to form a brine, directing the separated water from said water knock-out vessel into the body of deliquescent material to increase the concentration of brine formed by absorbing moisture from said stream by said material.

collecting as a resultant brine the brine formed from said moisture absorbing step and the brine which is formed by said separated water having been directed through the deliquescent material, and directing at least a portion of said resultant brine into the restricted connection for mixing with the gas stream prior to expansion of gas into said second separating vessel for the prevention of hydrate solids.

2. The method of inhibiting the formation of solids during low temperature separation of liquids from a hydrocarbon gaseous stream initially containing gas and water components which comprises:

passing the gaseous stream under pressure to a separating vessel through a restricted connection for causing expansion of said gaseous stream upon entering the vessel with resultant reduced pressure and temperature, passing the expanded gaseous stream through a body of deliquescent dehydrating material capable of absorbing water from the stream to form a brine, collecting the brine formed by the water absorbing step, directing at least a portion of said collected brine into the gaseous stream to mix the brine with said stream prior to expansion thereof, introducing supplemental make-up liquid into the deliquescent dehydrating material to produce a second brine, mixing said second brine with the previously formed brine to increase the concentration of the combined brine, sensing the concentration of the collected brine, and utilizing the indications of the sensing step to control the supply of supplemental make-up liquid to said deliquescent material.

3. The method of inhibiting the formation of solids during low temperature separation of liquids from a hydrocarbon gaseous stream initially containing gas and water components which comprises:

passing the gaseous stream under pressure to a separating vessel through a restricted connection for causing expansion of said gaseous stream upon entering the vessel with resultant reduced pressure and temperature, passing the expanded gaseous stream through a body of deliquescent dehydrating material capable of absorbing water from the stream to form a brine, collecting the brine formed by the water absorbing step, directing at least a portion of said collected brine into the gaseous stream to mix the brine with said stream prior to expansion thereof, introducing supplemental make-up liquid into the deliquescent dehydrating material to produce a second brine, mixing said second brine with the previously formed brine to increase the concentration of the combined brine, sensing the temperature of the expanded gaseous stream at its entry into the separating vessel, and utilizing the indications of the sensed temperature to control the supply of supplemental make-up liquid to the deliquescent dehydrating material.

4. The method of inhibiting the formation of solids during low temperature separation of liquids from a hydrocarbon gaseous stream initially containing gas and water components which comprises:

passing the gaseous stream under pressure to a separating vessel through a restricted connection for causing expansion of said gaseous stream upon entering the vessel with resultant reduced pressure and temperature, passing the expanded gaseous stream through a body of deliquescent dehydrating material capable of absorbing water from the stream to form a brine, collecting the brine formed by the water absorbing step, directing at least a portion of said collected brine into the gaseous stream to mix the brine with said stream prior to expansion thereof, introducing supplemental make-up liquid into the deliquescent dehydrating material to produce a second brine, mixing said second brine with the previously formed brine to increase the concentration of the combined brine, sensing the rate of flow of the gaseous stream into the separating vessel, and utilizing the sensed flow rate to control the supply of supplemental make-up liquid to said deliquescent dehydrating material.

5. The method of inhibiting the formation of solids during low temperature separation of liquids from a hydrocarbon gaseous stream initially containing gas and water components which comprises:

passing the gaseous stream under pressure to a separating vessel through a restricted connection for causing expansion of said gaseous stream upon entering the vessel with resultant reduced pressure and temperature, passing the expanded gaseous stream through a body of deliquescent dehydrating material capable of absorbing water from the stream to form a brine, collecting the brine formed by the water absorbing step, directing at least a portion of said collected brine into the gaseous stream to mix the brine with said stream prior to expansion thereof, introducing supplemental make-up liquid into the deliquescent dehydrating material to produce a second brine, mixing said second brine with the previously formed brine to increase the concentration of the combined brine, and controlling the introduction of the supplemental make-up liquid at regular predetermined intervals.

6. The method of inhibiting the formation of solids during low temperature separation of liquids from a hydrocarbon gaseous stream initially containing gas and water components which comprises:

passing the gaseous stream under pressure to a separating vessel through a restricted connection for causing expansion of said gaseous stream upon entering the vessel with resultant reduced pressure and temperature, passing the expanded gaseous stream through a body of deliquescent dehydrating material capable of absorbing water from the stream to form a brine, collecting the brine formed by the water absorbing step, directing at least a portion of said collected brine into the gaseous stream to mix the brine with said stream prior to expansion thereof, introducing supplemental make-up liquid into the deliquescent dehydrating material to produce a second brine, and mixing said second brine with the previously formed brine to increase the concentration of the combined brine.

7. The method of inhibiting the formation of solids during low temperature separation of liquids from a hydrocarbon gas stream initially containing gas and water components which comprises:

passing the gas stream under pressure to a separating vessel through a restricted connection for causing expansion of the gas stream upon entering the vessel with resultant reduced temperature and pressure, passing the expanded gas stream upward through a body of deliquescent dehydrating material capable of absorbing water from the stream to form a brine, collecting as a resultant brine the brine formed from said water absorbing step, and directing at least a portion of the resultant brine into the gas stream to mix with the gas stream prior to the expansion of the gas stream into said separating vessel to inhibit the formation of hydrate solids.

8. An apparatus for inhibiting the formation of solids during low temperature separation of liquids from a hydrocarbon gas stream initially containing gas and moisture components which comprises:

a separation vessel having an inlet, a gas outlet, a hydrocarbon liquid outlet and a brine outlet, a conductor for conducting said gas stream to said inlet, an upper absorption zone in said vessel having deliquescent material therein, a lower liquid separation zone to separate liquid hydrocarbons from brine, a restriction in said inlet to said vessel whereby the pressure of the gas stream flowing into said vessel is reduced allowing the gaseous portion of said stream to be cooled by the expansion to condense liquids from said stream, said gas outlet from said vessel positioned to discharge gas therefrom after flowing through said absorption zone, said deliquescent material absorbing moisture from the gas flowing therethrough to form a brine, means in the lower liquid separation zone for collecting said brine, and means connecting said brine outlet of said vessel to said gas stream conductor to direct at least a portion of the brine from said liquid separation zone to mix with said gas stream prior to expansion of said stream into said vessel to inhibit the formation of hydrate solids.

9. An apparatus according to claim 8, together with:
a source of supplemental water, and
means connecting said source of water to said absorption zone whereby water is directed into said body of deliquescent material to increase the concentration of brine formed by absorption of moisture.

10. The method of inhibiting the formation of solids during low temperature separation of liquids from a hydrocarbon gaseous stream initially containing gas and water components which comprises:
passing the gaseous stream under pressure to a separating vessel through a restricted connection for causing expansion of said gaseous stream upon entering the vessel with resultant reduced pressure and temperature,
passing the expanded gaseous stream through a body of deliquescent dehydrating material capable of absorbing water from the stream to form a brine,
collecting the brine formed by the water absorbing step,
directing at least a portion of said collected brine into the gaseous stream to mix the brine with said stream prior to expansion thereof,
introducing supplemental make-up liquid into the deliquescent dehydrating material to produce a second brine,
mixing said second brine with the previously formed brine to increase the concentration of the combined brine,
collecting liquids which are removed from the gas stream and which have the characteristic of producing the second brine when passed through the deliquescent material, and
utilizing at least a portion of said collected liquids as the supplemental make-up liquid in the production of said second brine.

11. An apparatus for inhibiting the formation of solids during low temperature separation of liquids from a hydrocarbon gas stream initially containing gas and moisture components which comprises:
a separation vessel having an inlet, a gas outlet, a hydrocarbon liquid outlet and a brine outlet,
a conductor for conducting said gas stream to said inlet,
an upper absorption zone in said vessel having deliquescent material therein,
a lower liquid separation zone to separate liquid hydrocarbons from brine,
a restriction in said inlet to said vessel whereby the pressure of the gas stream flowing into said vessel is reduced allowing the gaseous portion of said stream to be cooled by the expansion to condense liquids from said stream,
said gas outlet from said vessel positioned to discharge gas therefrom after flowing through said absorption zone,
said deliquescent material absorbing moisture from the gas flowing therethrough to form a brine,
means in the lower liquid separation zone for collecting said brine,
means connecting said brine outlet of said vessel to said gas stream conductor to direct at least a portion of the brine from said liquid separation zone to mix with said gas stream prior to expansion of said stream into said vessel to inhibit the formation of hydrate solids,
means for collecting liquids which are removed from the gas stream and which have the characteristic of producing additional brine when passed through the deliquescent material,
means for flowing a portion of said liquids through said body of deliquescent material to form such additional brine, and
means for mixing said additional brine with the previously formed brine to increase the concentration thereof.

References Cited by the Examiner
UNITED STATES PATENTS

| | | | |
|---|---|---|---|
| 2,151,248 | 3/1939 | Vaughan | 62—20 X |
| 2,665,565 | 1/1954 | Parks. | |
| 2,747,002 | 5/1956 | Walker. | |
| 2,758,665 | 8/1956 | Francis | 62—20 X |
| 2,916,103 | 12/1959 | Daugherty | 55—221 |
| 2,995,203 | 8/1961 | Maurer | 55—221 X |

NORMAN YUDKOFF, *Primary Examiner.*

J. JOHNSON, *Assistant Examiner.*